United States Patent
Donderici et al.

(10) Patent No.: US 10,844,705 B2
(45) Date of Patent: Nov. 24, 2020

(54) SURFACE EXCITED DOWNHOLE RANGING USING RELATIVE POSITIONING

(71) Applicant: Halliburton Energy Services, Inc., Houston, TX (US)

(72) Inventors: Burkay Donderici, Houston, TX (US); Clinton James Moss, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/528,951

(22) PCT Filed: Jan. 20, 2016

(86) PCT No.: PCT/US2016/014022
§ 371 (c)(1),
(2) Date: May 23, 2017

(87) PCT Pub. No.: WO2017/127060
PCT Pub. Date: Jul. 27, 2017

(65) Prior Publication Data
US 2018/0313203 A1 Nov. 1, 2018

(51) Int. Cl.
*E21B 47/022* (2012.01)
*E21B 47/0232* (2012.01)
*G01V 3/18* (2006.01)
*E21B 7/04* (2006.01)
*G01V 3/30* (2006.01)

(52) U.S. Cl.
CPC ............ *E21B 47/0232* (2020.05); *E21B 7/04* (2013.01); *G01V 3/18* (2013.01); *G01V 3/30* (2013.01)

(58) Field of Classification Search
None
See application file for complete search history.

(56) References Cited

U.S. PATENT DOCUMENTS

| | | | |
|---|---|---|---|
| 5,513,710 A | 5/1996 | Kuckes | |
| 5,515,931 A | 5/1996 | Kuckes | |
| 5,561,245 A * | 10/1996 | Georgi | E21B 47/10 324/324 |
| 5,610,331 A * | 3/1997 | Georgi | E21B 47/10 73/152.18 |
| 6,466,020 B2 | 10/2002 | Kuckes et al. | |
| 6,626,252 B1 | 9/2003 | Kuckes | |

(Continued)

FOREIGN PATENT DOCUMENTS

| | | |
|---|---|---|
| WO | WO 2014/098891 A1 | 6/2014 |
| WO | WO 2015/099785 A1 | 7/2015 |

OTHER PUBLICATIONS

Merriam-webster definition of second, 1 page, May 16, 2019.*

(Continued)

*Primary Examiner* — Tung S Lau
(74) *Attorney, Agent, or Firm* — Haynes and Boone, LLP (57) ABSTRACT

A downhole relative positioning system utilizes electromagnetic and survey measurements from a first well to calibrate a formation model, which is then used to improve the interpretation of measurements from a second well. Since the methods described herein utilize a differential approach, even though the exact position of each wellbore may not be accurately identified, their relative positions can be accurately identified.

17 Claims, 7 Drawing Sheets

(56) References Cited

U.S. PATENT DOCUMENTS

| | | |
|---|---|---|
| 7,219,749 B2 | 5/2007 | Kuckes |
| 10,294,773 B2 * | 5/2019 | Donderici ................. E21B 7/04 |
| 2005/0211469 A1 | 9/2005 | Kuckes et al. |
| 2006/0066454 A1 | 3/2006 | Kuckes et al. |
| 2009/0194333 A1 * | 8/2009 | MacDonald ............ E21B 43/24 |
| | | 175/45 |
| 2010/0155139 A1 | 6/2010 | Knuckes |
| 2010/0256913 A1 | 10/2010 | Kuckes |
| 2010/0284250 A1 | 11/2010 | Cornish et al. |
| 2012/0046871 A1 * | 2/2012 | Naville ..................... G01V 1/42 |
| | | 702/17 |
| 2012/0139530 A1 * | 6/2012 | McElhinney ....... E21B 47/0228 |
| | | 324/207.13 |
| 2012/0163123 A1 * | 6/2012 | Moos ....................... G01V 1/50 |
| | | 367/31 |
| 2013/0144530 A1 * | 6/2013 | Bittar ....................... G01V 3/28 |
| | | 702/7 |
| 2013/0341092 A1 * | 12/2013 | Hay .................... E21B 47/0228 |
| | | 175/24 |
| 2014/0374159 A1 * | 12/2014 | McElhinney ......... E21B 43/305 |
| | | 175/45 |
| 2015/0083409 A1 * | 3/2015 | Hay ..................... E21B 17/1078 |
| | | 166/254.1 |
| 2015/0346381 A1 | 12/2015 | Donderici |
| 2016/0017704 A1 * | 1/2016 | Camwell ................. E21B 47/09 |
| | | 250/257 |
| 2016/0047224 A1 * | 2/2016 | Wilson .................. E21B 47/092 |
| | | 175/45 |
| 2016/0168977 A1 * | 6/2016 | Donderici ........... E21B 43/2408 |
| | | 175/45 |
| 2016/0216396 A1 * | 7/2016 | Golla .................. E21B 47/0228 |
| 2016/0273345 A1 * | 9/2016 | Donderici ................ E21B 7/04 |
| 2017/0275985 A1 * | 9/2017 | Fouda ...................... G01V 3/26 |

OTHER PUBLICATIONS

Merriam-webster definition of range, 1 page, May 16, 2019.*
Pioneer Natural Resources Uses Active Magnetic Ranging to Avoid Risk of Wellbore Collision, Halliburton, 2 pages (Year: 2008).*
International Search Report and the Written Opinion of the International Search Authority, or the Declaration, dated Sep. 12, 2016, PCT/US2016/014022, 9 pages, ISA/KR.

* cited by examiner

FIG. 1

FIG. 2B (b) Receiver geometry

FIG. 2A (a) Receiver configuration

SURFACE EXCITED DOWNHOLE RANGING USING RELATIVE POSITIONING

PRIORITY

The present application is a U.S. National Stage patent application of International Patent Application No. PCT/US2016/014022, filed on Jan. 20, 2016, the benefit of which is claimed and the disclosure of which is incorporated herein by reference in its entirety.

FIELD OF THE DISCLOSURE

The present disclosure relates generally to downhole ranging and, more specifically, to a relative positioning system using surface excitation to determine and track the relative location of multiple wellbores.

BACKGROUND

As the easy-to-access and easy-to-produce hydrocarbon resources have been depleted over the last century, more and more difficult wells remain. As the world's hydrocarbon demand is continuously growing, meeting this demand requires development of more advanced recovery procedures, one of which is the Steam Assisted Gravity Drainage ("SAGD") application. SAGD addresses the mobility problem of heavy oil wells by injecting high pressure and temperature steam to reduce viscosity of the oil, thereby allowing easier extraction. The injection is performed from a wellbore (i.e., injector) that is drilled in parallel to the producing well (i.e., producer) at a distance in the order of a few meters from each other. The placement of the injector well needs to be achieved within a very small margin of error in distance, since drilling the wells tool closely exposes the producing well to very high pressures/temperatures, and drilling the wells too far apart reduces efficiency of the process.

It is well known that traditional surveying techniques based on gravity and the earth's magnetic fields suffer from a widening cone of uncertainty as the well gets farther from the wellhead. As a result, such techniques cannot achieve the precision in placement that is required in ranging applications. Therefore, most of the existing ranging methods depend on sources that are placed in the target well, which are not desirable due to increased cost of maintaining an operations crew for the second well. On the other hand, existing commercial services based on surface excitation do not suffer from this cost problem; however, they can only perform ranging at very shallow depths. As a result, their precision is not good enough to place the wells reliably within the target zone in a SAGD application.

DESCRIPTION OF ILLUSTRATIVE EMBODIMENTS

Illustrative embodiments and related methodologies of the present disclosure are described below as they might be employed in ranging systems and methods utilizing surface excitation and the relative positioning of a first and second wellbore. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, illustrative embodiments and methods of the present disclosure describe ranging systems that improve on the surface excitation techniques to make it more accurate and reliable. This is achieved by utilizing electromagnetic and survey measurements from a first well to calibrate a formation model, which is then used to improve the interpretation of measurements from a second well. Since the methods described herein utilize a relative approach, even though the exact position of each wellbore may not be accurately identified, their relative positions can be accurately identified. Moreover, one of the many advantages to this disclosure is that it allows the use of absolute signals rather than gradients, which improves the operational range of the surface system.

Although the present disclosure may be utilized in a variety of applications, the following description will focus on applications for accurately, and reliably positioning a well being drilled (e.g., injector or monitoring well) with respect to a nearby target first well, usually the producer well, so that the injector well can be maintained approximately parallel to the producer well. The target well must be of a higher conductivity than the surrounding formation, which may be realized through the use of an elongated conductive body along the target well, such as, for example, casing which is already present in most wells to preserve the integrity of the well and act as a conduit for flow of produced fluids. Also, the method and system of the disclosure are particularly desirable for the drilling of SAGD wells because the two wells can be drilled close to one another as is required in SAGD operations. These and other applications and/or adaptations will be understood by those ordinarily skilled in the art having the benefit of this disclosure.

Figure 1:
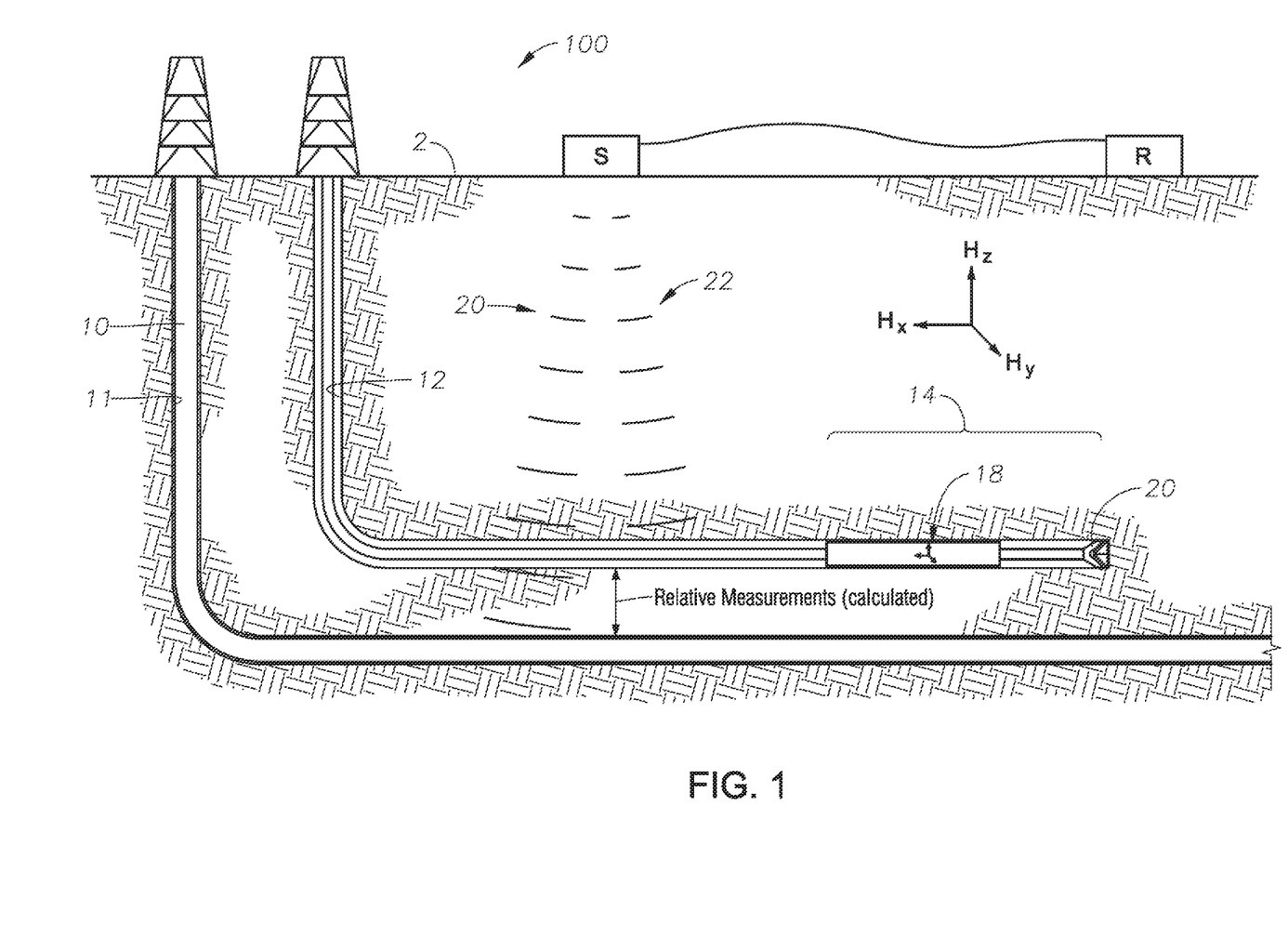
FIG. 1 illustrates a relative positioning system, according to an illustrative embodiment of the present disclosure.

FIG. 1 illustrates a relative positioning system 100 according to an illustrative embodiment of the present disclosure. In this embodiment, a producer well 10 is drilled using any suitable drilling technique. Thereafter, producer well 10 is cased with casing 11. An excitation source S for generating electromagnetic ("EM") waves is positioned on surface 2, along with a return R. An injector well 12 is then drilled using bottom hole assembly ("BHA") 14 which may be, for example, a logging-while drilling ("LWD") assembly, measurement-while drilling assembly ("MWD") or other desired drilling assembly. Although injector well 12 is described as being subsequently drilled, in other embodiments producer well 10 and injector well 12 may be drilled in turns. For example, vertical and build sections of the producer well may be drilled first, vertical and build sections of the injector well may be drilled next, the horizontal section of the producer well may be drilled next and the horizontal section of the injector well then be drilled. Moreover, in yet another alternate embodiment, BHA 14 may be embodied as a wireline application (without a drilling assembly) performing logging operations, as will be understood by those same ordinarily skilled persons mentioned herein.

In this illustrative embodiment, the BHA/drilling assembly 14 includes one or more electromagnetic sensors 18 that sense absolute and/or gradient electromagnetic fields emitted by surface excitation source S. Using processing circuitry aboard BHA 14 (or remotely located), the distance and direction from surface source S to sensors 18 is determined by analyzing the measured absolute electromagnetic fields at producer and injector wells 10,12, and their relative differences. In certain illustrative embodiments, the role of source S and sensors 18 can be changed without any difference in system operation based on EM reciprocity theorem. For example, surface excitation source S can be replaced by a sensor with the same dimensions and associated antenna, and sensors 18 can be replaced by a source with the same dimensions and associated antenna, thereby reversing the roles. However, for simplicity only, the system based on surface source S and downhole receivers 18 will be presented.

Still referring to FIG. 1, excitation source S is located at or near surface 2. In various embodiments, source S may be any type that produces electric, magnetic or electromagnetic signals. Some examples include electrode pair, electric dipole (e.g., wire antenna, toroidal winding), magnetic dipole (e.g., coil, solenoid antenna), large loop, long curved or linear wire. Excitation source S can be voltage controlled, current controlled or a combination of both. Source S typically produces low frequency waves with frequencies in the order of, for example, 0.02-250 Hz, to achieve the depth of penetration required by SAGD applications.

In other embodiments, for electronic simplicity, source S may be an EM pulse system which provides the advantage of multi-frequency data. Although the role of source transmitter S and sensors 18 can be switched, it should be noted that it is more advantageous to have source S at the surface due to easier access to higher levels of power required for source operation. In order to achieve 3D positioning, multiple sources S are required, each of which are located at a different position at surface 2. Each source S can be activated sequentially or simultaneously. In the latter case, each source S can be differentiated by its frequency of operation. Due to relative measurements between the wellbores described herein, source S is required to be stable with respect to the signal level that it generates, which indicates minimal variation with time. To achieve this, the power source system may require stabilization via an internal calibration feedback loop and thermal insulation or control.

In this embodiment, sensors/receivers 18 are located along BHA 14 and measure all three components of the electric or magnetic fields, which could be x, y and z in the tool coordinates (i.e., triaxial). Even though use of absolute signals is sufficient for the illustrative embodiments herein, more information can be obtained by measuring phase, real or imaginary components, or gradiometric information in alternate embodiments. Here, gradiometric information may be associated with the measurements in complex domain, phase or amplitude. Due to specific operational bands of excitation source S, sensors 18 must be sensitive at this range. Thus, in certain illustrative embodiments, sensors 18 may be, for example, an electrode pair, electric dipole (wire antenna, toroidal winding), magnetic dipole (coil, solenoid antenna), electric loop or magnetometer. The magnetometers/sensors can be of flux-gate or atomic type.

Furthermore, although not shown, BHA 14 includes processing circuitry necessary (i.e., system control center) to achieve the relative positioning of the present disclosure in real-time. Such circuitry includes a communications unit to facilitate interaction between the drilling system and a remote location (such as the surface). A visualization unit may also be connected to communications unit to monitor the measurement data being process; for example, an operator may intervene the system operations based on this data. A data processing unit may convert the received data into information giving the target's position, direction and orientation in real-time. Thereafter, results may be displayed via the visualizing unit.

The system control center of BHA 14 also includes the storage/communication circuitry necessary to perform the calculations described herein. In certain embodiments, that circuitry is communicably coupled to sensors 18 in order to process the received EM fields 20,22. Additionally, the circuitry on-board BHA 14 may be communicably coupled via wired or wireless connections to the surface to thereby communicate data back uphole and/or to other assembly components (to steer a drill bit forming part of assembly 14, for example). In an alternate embodiment, the system control center or other circuitry necessary to perform one or more aspects of the techniques described herein may be located at a remote location away from BHA 14, such as the surface or in a different wellbore. In other embodiments, the electromagnetic field measurements may be communicated remotely to the system control center for processing. These and other variations will be readily apparent to those ordinarily skilled in the art having the benefit of this disclosure.

Moreover, the on-board circuitry includes at least one processor and a non-transitory and computer-readable storage, all interconnected via a system bus. Software instructions executable by the system control center for implementing the illustrative relative positioning methodologies described herein in may be stored in local storage or some other computer-readable medium. It will also be recognized that the positioning software instructions may also be loaded into the storage from a CD-ROM or other appropriate storage media via wired or wireless methods.

Moreover, those ordinarily skilled in the art will appreciate that various aspects of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

To summarize the operation of relative positioning system 100 of FIG. 1, in one illustrative method a first wellbore 10 is drilled using BHA 14. As it is being drilled, excitation source S emits electromagnetic waves 20 toward wellbore 10, which are received by sensors 18 which, using processing circuitry onboard BHA 14, generate corresponding first measurement signals. As will be described in more detail below, the first measurement signals also comprise survey measurements of the first wellbore obtained during logging operations, for example. Thereafter, in this example, BHA 14 is also used to drill a second wellbore 12, whereby electromagnetic waves 22 are emitted by excitation source S, and received by sensors 18 to produce second measurement signals. The second measurement signals also include survey data previously obtained. Then, using the principles described herein, processing circuitry calculates the differences between the first and second measurement signals (i.e., differential measurements). The differential measurements are then utilized to determine the relative positions of wellbores 10 and 12.

Figure 2A:
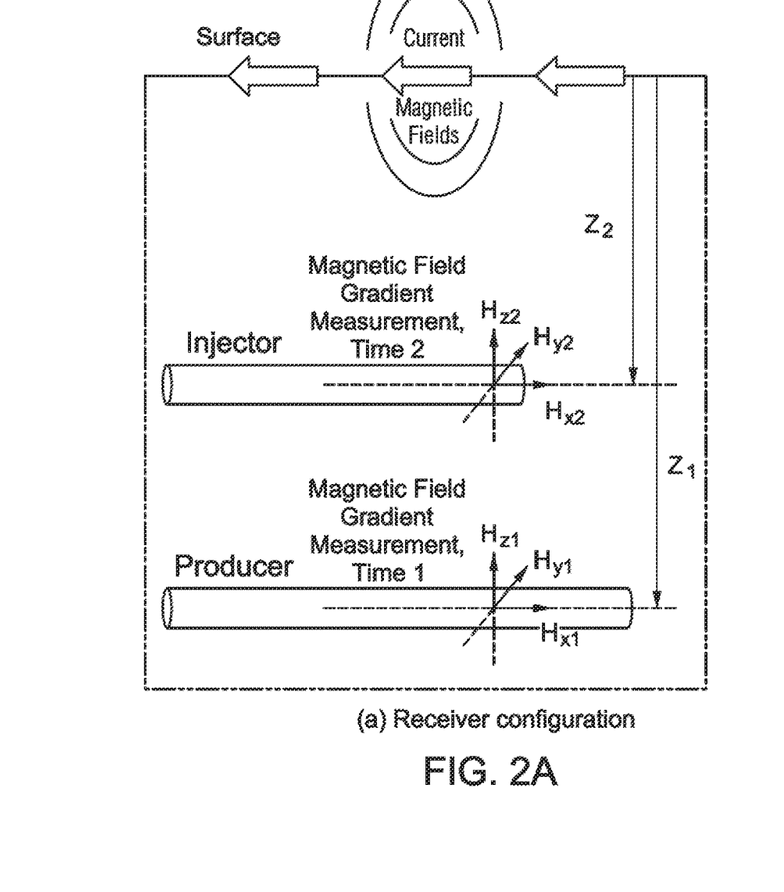
FIGS. 2A-2B shows an illustration of a triaxial magnetic dipole sensor configuration at each well, in relation to a linear surface source, according to certain illustrative embodiments of the present disclosure.
Figure 2B:
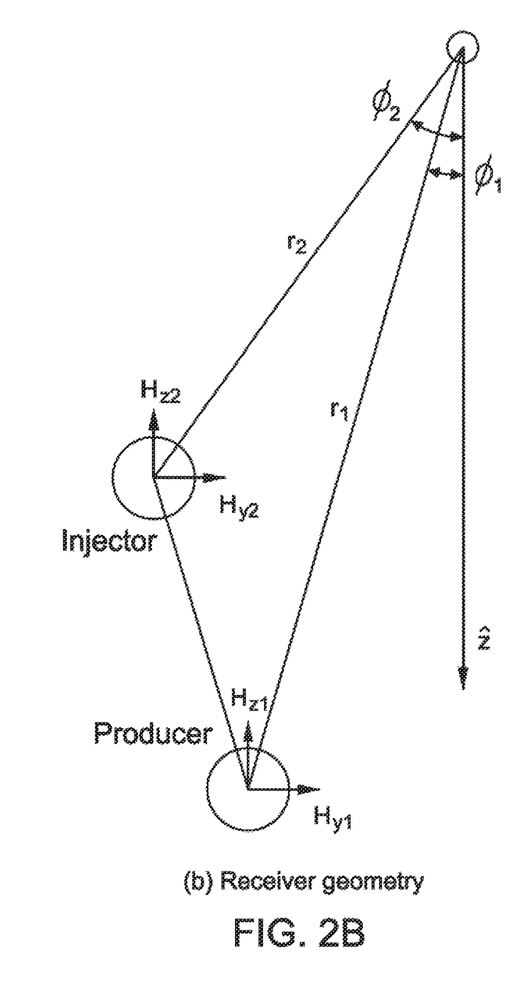

FIGS. 2A-2B shows an illustration of a triaxial magnetic dipole sensor configuration at each well, in relation to a linear surface source, according to certain illustrative embodiments of the present disclosure. In this embodiment, only absolute signals are utilized in each well since gradient signals over such long distances would be small, thus creating a signal to noise problem. Here, we show two wells, an injector and producer as previously described in relation to FIG. 1. Even though one sensor station per well is shown, multiple sensors can be used along the BHA. Thus, certain embodiments may include an array of triaxial sensors in either or both of the wells. In other embodiments, bi-axial receivers may be used in cases where excitation source geometry and sensor orientation is well defined and well controlled.

Referring to FIGS. 2A-2B, magnetic field distribution due to a linear source of current I in both wells can be written as:

$$H_{y1} = \frac{IG}{2\pi r_1} \quad \text{Eq. (1)}$$

$$H_{y2} = \frac{IG}{2\pi r_2},$$

where G is the measurement gain of the magnetometers; $r_1$ is radial distance of the producer from the source; $r_2$ is radial distance of the injector from the source; $H_{y1}$ is the y-component of the magnetic field measurement at the producer; and $H_{y2}$ is the y-component of magnetic field measurement at the injector. The term G typically depends on the particular environment that the magnetometer is operating at such as, for example, the temperature and presence of magnetic materials in the formation. By utilizing the same magnetometer in the producer and injector wells, and also through corrections on temperature variations on the sensor electronics, G can be controlled to be the same between the two wells. By measuring the difference in magnetic fields between the wells and the average magnetic fields in both wells, the difference in ranges (i.e., differential measurement) can be calculated as:

$$r_2 - r_1 = (r_1 + r_2)\frac{H_{y1} - H_{y2}}{H_{y1} + H_{y2}}. \quad \text{Eq. (2)}$$

Here it can be observed that this differential measurement between the ranges is calculated independent of terms G and I, when $r_1$ and $r_2$ is provided by a survey measurement. It can also be observed that the error in the difference between the ranges will be in the order of the percentage error in the survey depth, which is generally lower than 5%. The azimuthal direction to the producer and the injector can be calculated as:

$$\phi_1 = \tan^{-1}\left(\frac{H_{z1}}{H_{y1}}\right) \quad \text{Eq. (3)}$$

$$\phi_2 = \tan^{-1}\left(\frac{H_{z2}}{H_{y2}}\right).$$

Similar to the differential measurement calculated in Eq (2), this calculation does not depend on G or I. Finally, through geometric calculation, the distance between the wells can be found as:

$$\Delta r = \sqrt{r_1^2 + r_2^2 - 2r_1 r_2 \cos(\phi_2 - \phi_1)} \quad \text{Eq. (4)}$$

$$= \sqrt{(r_2 - r_1)^2 + 2r_1 r_2 (1 - \cos(\phi_2 - \phi_1))}$$

$$= \sqrt{\left((r_1 + r_2)\frac{H_{y1} - H_{y2}}{H_{y1} + H_{y2}}\right)^2 + 2r_1 r_2\left(1 - \cos\left(\tan^{-1}\left(\frac{H_{z2}}{H_{y2}}\right) - \tan^{-1}\left(\frac{H_{z1}}{H_{y1}}\right)\right)\right)}.$$

Again, this particular distance calculation does not depend on particular values of G or I, when $r_1$ and $r_2$ is provided by a survey measurement. It can also be observed that the error in the distance between the wells will be in the order of the percentage error in the survey depth, which is generally lower than 5%. Accordingly, electromagnetic and survey measurements from the first well are used to calibrate the formation model, which is then used to improve the interpretation of measurements from the second well. As a result, the relative position of the wells is accurately determined in a more robust and efficient manner than conventional approaches.

Figure 3:
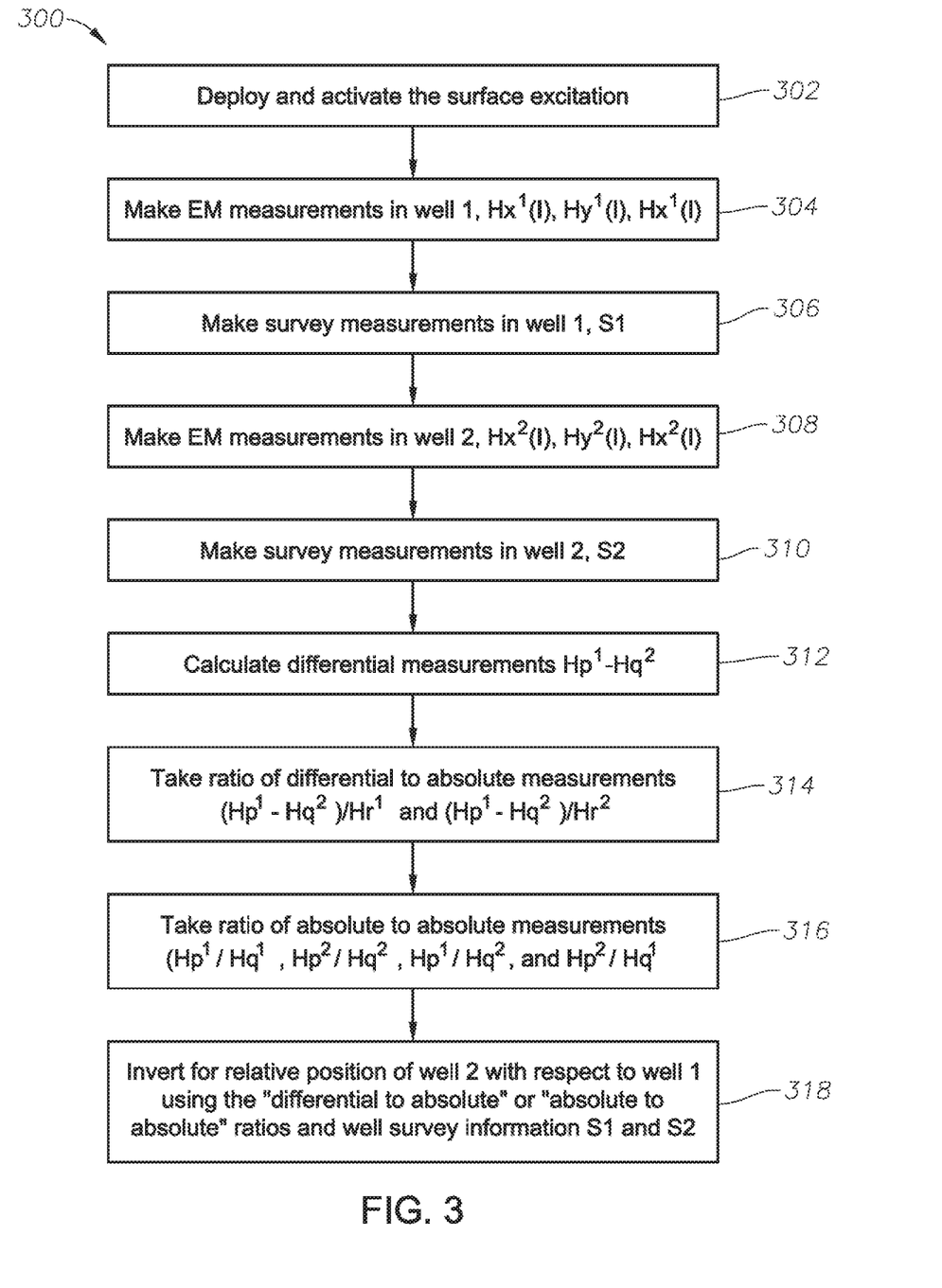
FIG. 3 is a flow chart for a relative positioning method useful for downhole ranging applications, according to certain illustrative methods of the present disclosure.

The description above targeted a special case with a linear excitation source shape. This type of source is usually not feasible operationally because it requires a physical line to be placed linearly on a terrain which may not be linear or accessible. Note, however, the same concept can be generalized to any source shape by following the illustrative method described below. FIG. 3 is a flow chart 300 for a relative positioning method useful for downhole ranging applications, according to certain illustrative methods of the present disclosure. The example of method 300, the surface system is deployed and activated at block 302, and kept unchanged throughout the application. It should be emphasized that stability of the surface system (e.g., excitation source and return) is crucial for success of the proposed method, which can be achieved by different methods including, for example, measurement and feedback control and thermal insulation of the excitation source S.

At block 304, tri-axial electromagnetic measurement signals are acquired in the first well are taken, which are denoted as $Hx^1(l)$, $Hy^1(l)$ and $Hz^1(l)$ where l is the measured depth of the sensor during the measurement. EM measurements typically have units of electric field, magnetic field, voltage or current. The EM measurements are preferably taken on a LWD BHA in an open-hole environment; however, a wireline conveyed system, or cased-hole environment (FIG. 1, e.g.) can also be used. As mentioned before, a bi-axial measurement can also be used in cases where the sensitivity of the third measurement is not essential.

At block 306, a survey of the first well is also taken, which is denoted as $S^1(l)$. The survey measurements can be in units of relative position and orientation relative to a reference point and coordinate system. At block 308, EM measurements in the second well are taken and denoted as $Hx^2(l)$, $Hy^2(l)$ and $Hz^2(l)$, in the same way as described in block 304. At block 310, survey measurements in the second well are taken similar to the first well as described above, and denoted as $S^2(l)$. At blocks 312, 314 and 316, different relative measurements between the two wells are calculated (i.e., the term "relative measurement" is broadly used herein to denote blocks 312, 314 or 316). For example, at block 312, the difference between the measurement signals of the wellbores is calculated using Eqs. (1)-(4) previously described, denoted as $Hp^1$ and $Hq^2$ (p and q can by the x, y or z measurements), also referred to as the differential measurement.

During operation of certain embodiments, the gain and current of the system is kept the same by utilizing the same sensor system in both the producer and injector wells, and controlling the surface excitation source S and downhole sensor conditions the same. In order to compensate for the differences in temperature in the two wells, a temperature correction may be applied to the measurements based on a surface heat run, for example.

The differential measurement of block 312 may be normalized in certain methods. At block 314, ratios of the differential measurement to absolute measurements of the first and second wellbores are calculated, denoted by $(Hp^1-Hq^2)/Hr^1$ and $(Hp^1-Hq^2)/Hr^2$. In addition or in the alternative, at block 316, a ratio of the absolute measurement of the first well to the second well, or vice versa is calculated, as denoted by $Hp^1/Hq^1$, $Hp^2/Hq^2$, $H^1/Hq^2$, and $Hp^2/Hq^1$. These ensure that the measurements that are used in subsequent processing are normalized and independent of receiver gain and source current levels.

Finally, at block 318, an inversion procedure is conducted to determine the relative position of the wells, where an EM forward model result is calculated and compared against the real data. A numerical optimization is conducted to find the input parameters that match the synthetic and real results. In this example, the inversion is entirely based on the normalized measurement signals (differential to absolute or absolute to absolute ratios), using the survey data from both wells. Finally, the drilling path may be adjusted based on the calculated distance and relative direction between the wells. The forward model that is used in this inversion can be based on a homogeneous, 1D, 2D or 3D parameterization of the formation, with or without the borehole. Here, dimensionality may be defined as the number of dimensions where the material parameters are varying. The forward model can be based on, for example, finite different, finite element, analytical, semi-analytical, method of moments, integral equation, or any other type of electromagnetic modeling method.

In alternative embodiments, a known or assumed formation electrical resistivity, permeability and/or permittivity distribution can be input to the model to obtain more accurate results. In yet other embodiments, the electrical model of the formation can be updated based on a comparison between the modeled and real measurements. For example, resistivity of the model can be increased or decreased to better match the modeled and real measurements.

Still referring to FIG. 3, one or more of the blocks 312 (i.e., differential measurement), 314 (i.e., normalized measurement) and 316 (i.e., absolute ratio measurement) may be used together in the inversion of block 318. Blocks that are not used in the inversion can be skipped. The advantage of normalized measurement in block 314 compared to the differential measurement in block 312 is that any measurement errors or drifts that are common to both the first and second well measurements will be cancelled out by the ratio in block 314. Block 316 will perform similarly to block 314 in principle as long as a corresponding set of ratios are used, since normalized signals in block 314 can be represented as linear combinations of terms in block 316.

Figure 4:
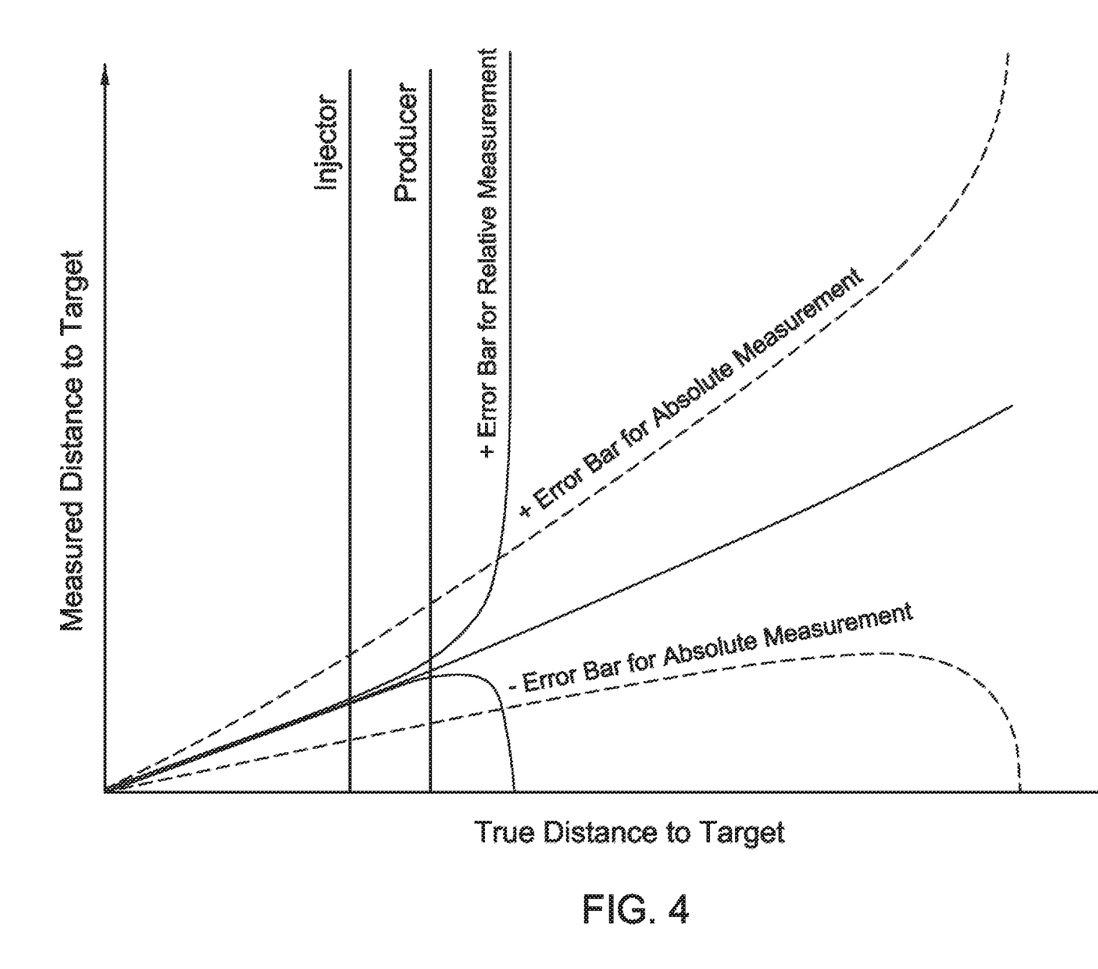
FIG. 4 is a graph of the ranges of absolute and relative measurements as a function of distance from the source to target.

Unlike prior art systems which focus on absolute measurements of the two wellbores, embodiments of the present disclosure determine the relative position of two wellbores. By using the relative measurement approach described herein, even though the exact position of each wellbore cannot be accurately identified, their relative positions can be accurately identified. With reference back to FIG. 1, the "differential measurements" measure the difference between fields at two points that are closer to each other. As a result, the relative signal levels are usually much smaller than the absolute signal levels that are received at individual points. As a result, the range of successful reception of a differential measurement is smaller compared to an absolute measurement. FIG. 4 is a graph of the ranges of absolute and differential measurements as a function of distance from the source to target. It shows the uncertainty of absolute measurement versus the differential measurements. In this example, both differential and absolute measurements can be made both in the injector and producer, but the differential measurement is more accurate due to the gain and current normalization that it provides.

Figure 5:
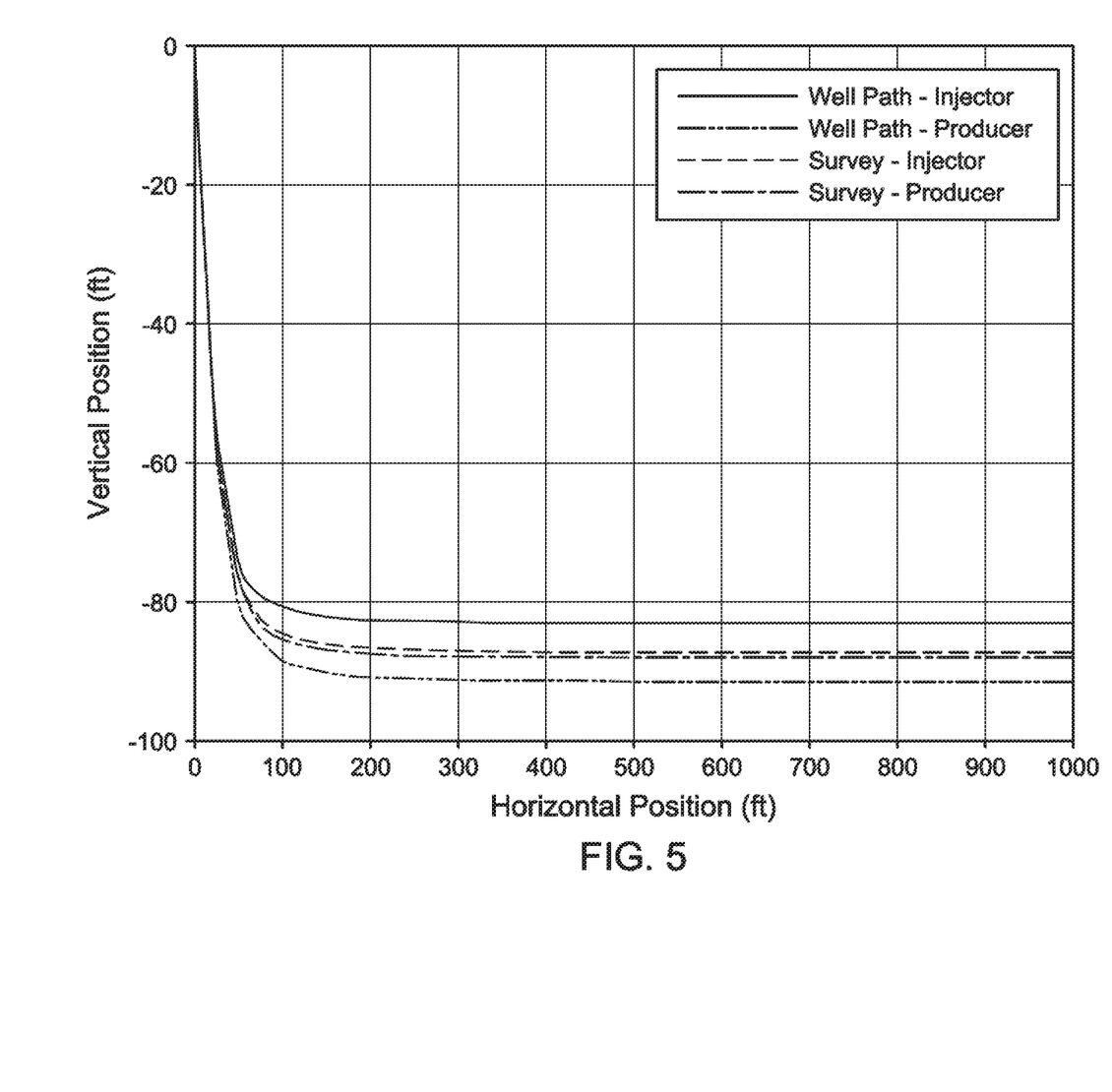
FIG. 5 is a graph showing an actual well path vs. survey measurements with a 5% error.
Figure 6:
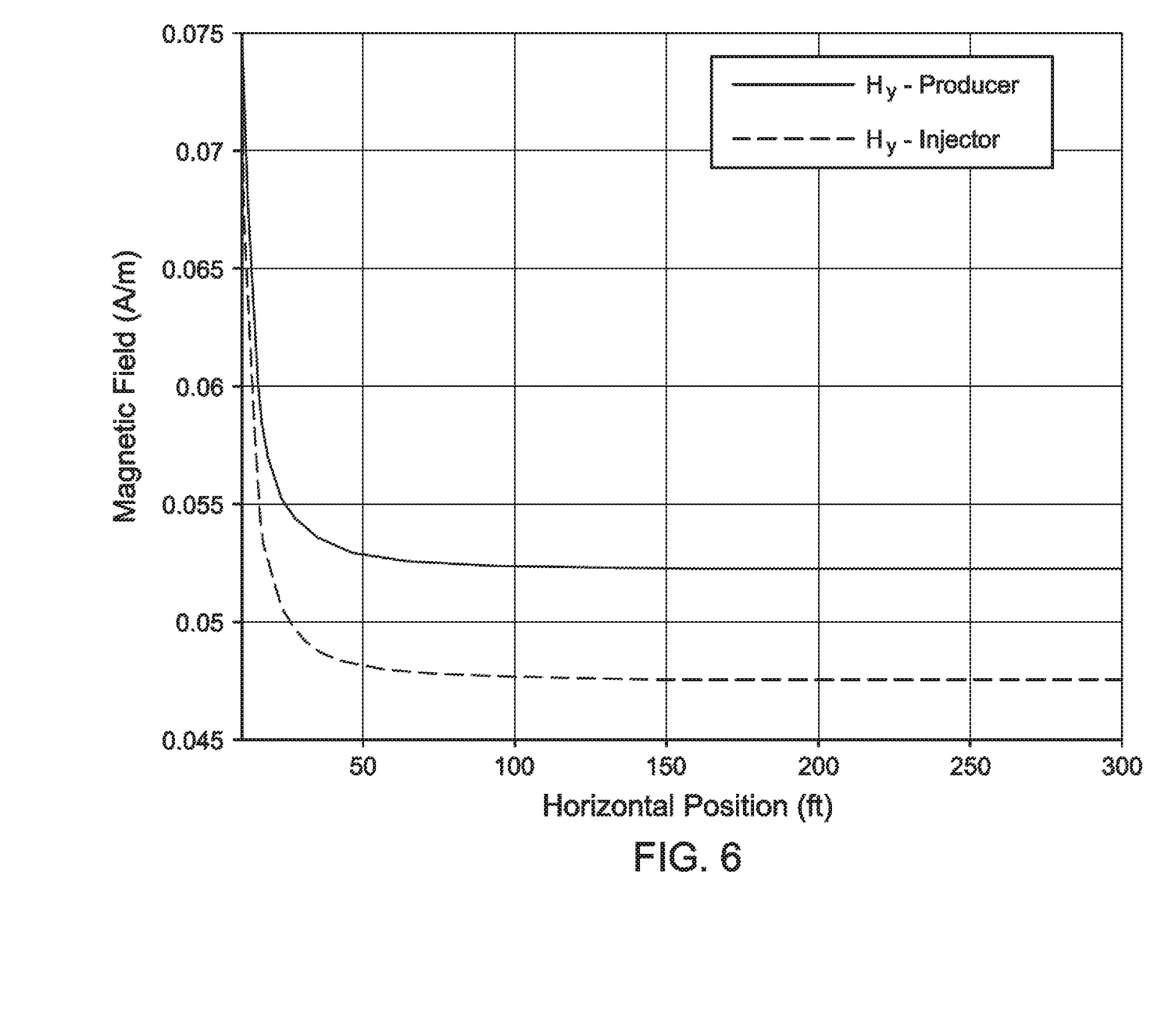
FIG. 6 is a graph showing magnetic fields measured in a producer and injector well.

In view of the foregoing, a simulated example of the present disclosure will now be described. A synthetic case with a 10000 feet long linear source, parallel source and receivers is considered to illustrate the advantages of the present disclosure. The source current is set at 10 Amperes and an excitation frequency of f=0.1 Hz is used. In this example, without loss of generality and for illustrative purposes, the wells are assumed to be aligned in the horizontal plane. The well paths and surveys are shown in FIG. 5, which shows a 5% error is introduced to both the producer and injector surveys, which is in line with what is expected in practice. As can be seen from FIG. 5, with 5% error in each survey, the distance between well estimation from the surveys become approximately 1 foot, which is very inaccurate. FIG. 6 shows the Hy(l) magnetic fields that are measured at the producer and injector wells. In FIG. 6, it is seen that the magnetic field levels are within measurable range.

Figure 7:
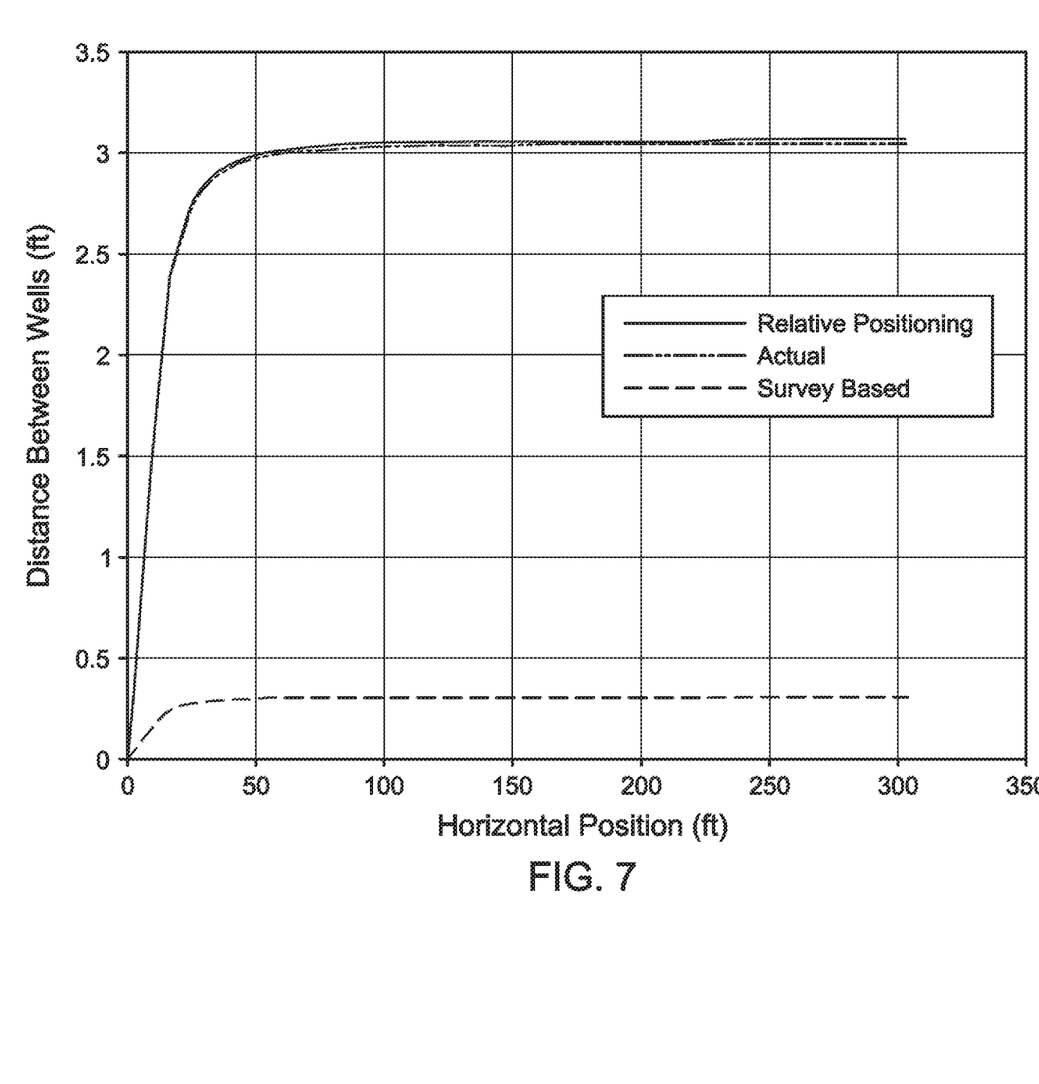
FIG. 7 is a graph showing relative ranging results versus survey results (a 5% error is applied to survey), according to certain illustrative embodiments of the present disclosure.

FIG. 7 shows the distance between the wells that is calculated by applying the methodology described in Equations (1)-(4). It can be seen that very accurate ranging results can be obtained without knowing precisely the current or receiver gain levels, through the use of self-normalization. It can also be seen that the survey errors did not create any significant error in the range estimation as predicted. In this example, this is partially due to cancellation of errors when the survey ranges are added in Eq. (2). Even in the worst case of constructive 5% errors in both producer and injector wells, a maximum of 10% error will be observed in range estimation which is acceptable.

The embodiments described herein may be altered in a variety of ways. For example, in one method, a BHA having a first sensor as described herein may be deployed along a first wellbore. A first measurement signal is then acquired using the first sensor. The BHA is then retrieved from the first wellbore, and thereafter deployed along a second wellbore, whereby a second measurement signal is acquired using the first sensor. Alternatively, a second sensor may be used to acquire the second measurement signal. In yet another method, the first and second sensors are calibrated using the same excitation source. The BHA may then be steered along a desired path (or to avoid a structure) based upon the relative measurements.

Methods and embodiments described herein further relate to any one or more of the following paragraphs:

1. A method for downhole ranging, comprising acquiring first measurement signals in a first wellbore; acquiring second measurement signals in a second wellbore; calculating a relative measurement between the first and second measurement signals; and determining a position of the second wellbore relative to the first wellbore using the relative measurement.

2. A method as defined in paragraph 1, wherein calculating the relative measurement comprises calculating a differential measurement between the first and the second measurement signals.

3. A method as defined in paragraphs 1 or 2, wherein calculating the relative measurement further comprises calculating a ratio of the differential measurement to the first or second measurement signals.

4. A method as defined in any of paragraphs 1-3, wherein calculating the relative measurement further comprises calculating a ratio of the first measurement signal to the second measurement signal; or the second measurement signal to the first measurement signal.

5. A method as defined in any of paragraphs 1-4, wherein determining the position of the second wellbore comprises performing an inversion using survey data from the first or second wellbores.

6. A method as defined in any of paragraphs 1-5, wherein determining the position of the second wellbore comprises performing an inversion using survey data from the first or second wellbores; and a ratio of the differential measurement to the first or second measurement signals.

7. A method as defined in any of paragraphs 1-6, wherein performing the inversion comprises performing the inversion using a ratio of the first measurement signal to the second measurement signal; or the second measurement signal to the first measurement signal.

8. A method as defined in any of paragraphs 1-7, wherein acquiring the first measurement signal comprises deploying a first sensor along the first wellbore; emitting a first source signal toward the first wellbore; and measuring the first source signal using the first sensor, thereby acquiring the first measurement signal; and acquiring the second measurement signal comprises: deploying a second sensor along the second wellbore; emitting a second source signal toward the second wellbore; and measuring the second source signal using the second sensor, thereby acquiring the second measurement signal.

9. A method as defined in any of paragraphs 1-8, wherein acquiring the first and second measurement signals comprises emitting a source signal toward the first and second wellbores using a surface excitation source.

10. A method as defined in any of paragraphs 1-9, wherein acquiring the first and second measurement signals comprises acquiring bi-axial or triaxial measurement signals.

11. A method as defined in any of paragraphs 1-10, wherein the first measurement signal is acquired using a first sensor; and the second measurement signal is acquired using the first sensor at a different time.

12. A method as defined in any of paragraphs 1-11, wherein the first measurement signal is acquired using a first sensor; and the second measurement is acquired using a second sensor.

13. A method as defined in any of paragraphs 1-12, wherein the first and second sensors are calibrated using a same excitation source.

14. A method as defined in any of paragraphs 1-13, wherein acquiring the first and second measurement signals comprise at least one of acquiring absolute, phase, or real or imaginary measurements.

15. A method as defined in any of paragraphs 1-14, wherein the first and second measurement signals are acquired using a sensor deployed on a bottom hole assembly.

16. A method as defined in any of paragraphs 1-15, further comprising steering the bottom hole assembly deployed along the second wellbore using the determined position of the second wellbore.

17. A method as defined in any of paragraphs 1-16, further comprises avoiding the first wellbore using the determined position of the second wellbore.

18. A system for downhole ranging, comprising an excitation source positioned adjacent a surface location; a bottom hole assembly to be positioned along a wellbore; one or more sensors positioned along the bottom hole assembly; and processing circuitry coupled to the sensors and configured to implement a method comprising: acquiring first measurement signals in a first wellbore; acquiring second measurement signals in a second wellbore; calculating a relative measurement between the first and second measurement signals; and determining a position of the second wellbore relative to the first wellbore using the relative measurement.

19. A system as defined in paragraph 18, wherein calculating the relative measurement comprises calculating a differential measurement between the first and the second measurement signals.

20. A system as defined in paragraphs 18 or 19, wherein calculating the relative measurement further comprises calculating a ratio of the differential measurement to the first or second measurement signals.

21. A system as defined in any of paragraphs 18-20, wherein calculating the relative measurement further comprises calculating a ratio of the first measurement signal to the second measurement signal; or the second measurement signal to the first measurement signal.

22. A system as defined in any of paragraphs 18-21, wherein the excitation source is at least one of an electrode source, loop source, or dipole source.

23. A system as defined in any of paragraphs 18-22, wherein the first wellbore is a producer well; and the second wellbore is an injector well.

24. A system as defined in any of paragraphs 18-23, wherein the first wellbore is a blow out well; and the second wellbore is a relief well.

Moreover, the methods described herein may be embodied within a system comprising processing circuitry to implement any of the methods, or a in a computer-program product comprising instructions which, when executed by at least one processor, causes the processor to perform any of the methods described herein.

Although various embodiments and methodologies have been shown and described, the disclosure is not limited to such embodiments and methodologies and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method for downhole ranging, comprising:
   obtaining first measurement signals in a first wellbore;
   obtaining second measurement signals in a second wellbore;
   calculating a relative measurement between the first and second measurement signals;
   determining a position of the second wellbore relative to the first wellbore using the relative measurement; and
   using the relative measurement to perform downhole ranging.

2. A method as defined in claim 1, wherein calculating the relative measurement comprises calculating a differential measurement between the first and the second measurement signals.

3. A method as defined in claim 2, wherein calculating the relative measurement further comprises calculating a ratio of the differential measurement to the first or second measurement signals.

4. A method as defined in claim 1, wherein calculating the relative measurement further comprises calculating a ratio of:
   the first measurement signal to the second measurement signal; or
   the second measurement signal to the first measurement signal.

5. A method as defined in claim 1, wherein determining the position of the second wellbore comprises performing an inversion using survey data from the first or second wellbores.

6. A method as defined in claim 2, wherein determining the position of the second wellbore comprises performing an inversion using:
   survey data from the first or second wellbores; and
   a ratio of the differential measurement to the first or second measurement signals.

7. A method as defined in claim 5, wherein performing the inversion comprises performing the inversion using a ratio of:
   the first measurement signal to the second measurement signal; or
   the second measurement signal to the first measurement signal.

8. A method as defined in claim 1, wherein:
   obtaining the first measurement signal comprises:
      deploying a first sensor along the first wellbore;
      emitting a first source signal toward the first wellbore; and
      measuring the first source signal using the first sensor, thereby acquiring the first measurement signal; and
   obtaining the second measurement signal comprises:
      deploying a second sensor along the second wellbore;
      emitting a second source signal toward the second wellbore; and
      measuring the second source signal using the second sensor, thereby acquiring the second measurement signal.

9. A method as defined in claim 1, wherein obtaining the first and second measurement signals comprises emitting a source signal toward the first and second wellbores using a surface excitation source.

10. A method as defined in claim 1, wherein obtaining the first and second measurement signals comprises acquiring bi-axial or triaxial measurement signals.

11. A method as defined in claim 1, wherein:
    the first measurement signal is obtained using a first sensor; and
    the second measurement signal is obtained using the first sensor at a different time.

12. A method as defined in claim 1, wherein:
    the first measurement signal is obtained using a first sensor; and
    the second measurement is obtained using a second sensor.

13. A method as defined in claim 12, wherein the first and second sensors are calibrated using a same excitation source.

14. A method as defined in claim 1, wherein obtaining the first and second measurement signals comprise at least one of acquiring absolute, phase, or real or imaginary measurements.

15. A method as defined in claim 1, wherein the first and second measurement signals are obtained using a sensor deployed on a bottom hole assembly.

16. A method as defined in claim 15, further comprising steering the bottom hole assembly deployed along the second wellbore using the determined position of the second wellbore.

17. A method as defined in claim 1, further comprises avoiding the first wellbore using the determined position of the second wellbore.

* * * * *